Patented Sept. 25, 1923.

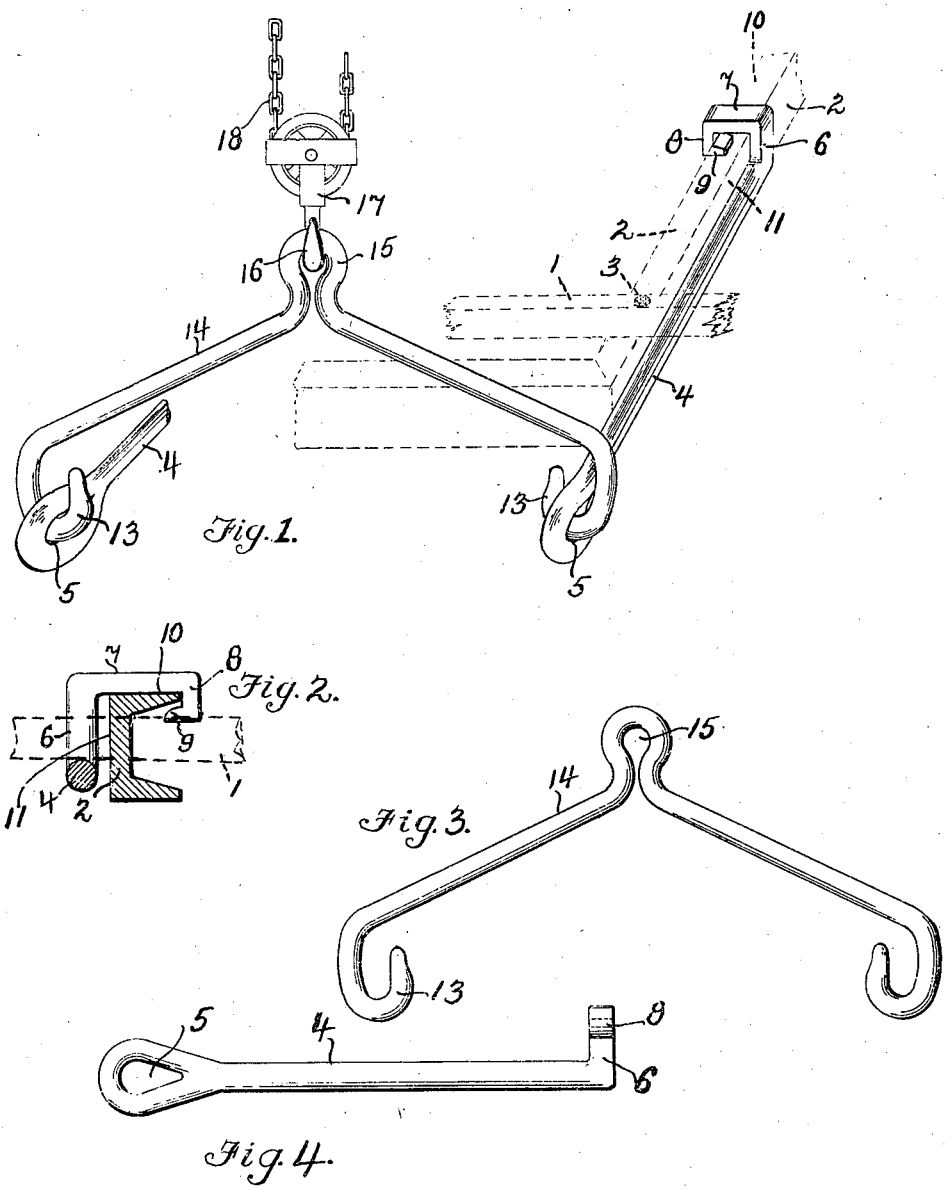

1,468,928

UNITED STATES PATENT OFFICE.

HARRY P. STEADMAN, OF CALAMUS, IOWA.

LIFTING DEVICE FOR AUTOMOBILE BODIES.

Application filed December 3, 1921. Serial No. 519,700.

*To all whom it may concern:*

Be it known that I, HARRY P. STEADMAN, a citizen of the United States, residing at Calamus, in the county of Clinton and State of Iowa, have invented certain new and useful Improvements in Lifting Devices for Automobile Bodies; and I do hereby declare the following to be a full, clear, and exact description of the invention, such as will enable others skilled in the art to which it appertains to make and use the same.

This invention relates to a lifting means for raising the rear portion of automobile bodies to facilitate repairs and other operations, and has for its object to provide a device which will be simple in construction, comparatively inexpensive to manufacture, easily applied, and more efficient in action than those which have been heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a perspective view partially broken away, of a device made in accordance with this invention;

Figure 2 is a detail sectional view illustrating how the device is applied to the framework of an automobile;

Figure 3 is an elevational view of a portion of the parts illustrated in Figure 1; and Figure 4 is a plan view of another portion of the parts shown in Figure 1.

In order that the nature and object of this invention may be the more clearly understood, it is said:

As is well known, the bodies of automobiles for various reasons have to be lifted when brought into the shop in order to make repairs thereon, and for other purposes, and at present there is in so far as I am aware, no device or instrument that has been proposed which is as convenient to apply, as simple in construction, and as inexpensive to manufacture as is the one now to be disclosed.

It is further well known that the supporting framework of a Ford automobile comprises at its rear a transversely disposed spring not illustrated, but which is located immediately above the rear axle, and immediately above this said transverse spring is a transverse member which I have conventionally indicated by the number 1, in Figure 1. This transverse member extends from side to side of the automobile and is secured to two longitudinal U-shaped frame members 2 which members are secured to the said transverse member as indicated at 3. These longitudinal frame members 2 in the Ford automobile are of the U-shape shown in Figure 2; they are made of steel, and therefore it is not an easy matter to utilize them when lifting the rear body portion of the automobile with the tools that have been heretofore proposed.

According to this invention, on the other hand, I provide a pair of rod like members 4 provided with eyes 5 at one end, and with the squared member 6 at the other end, extending at right angles from the rod portion 4. Also extending at right angles from the member 6 is a second member 7, and extending at right angles from the member 7 is a third member 8, and extending at right angles from the member 8 in toward the member 6, is a fourth member 9. The construction is such, as will be clear from Figures 1 and 2, that the members 7, 8, and 9 constitute a hook carried by the member 6, which is adapted to engage the upper flange 10 of the frame member 2, while the member 6 is adapted to lie flatwise against the vertical surface 11 of said member 2. Each of the eyes 5 of the rods 4 is engaged by the hooks 13 of the spanning member 14 provided with the bent portion 15 adapted to be engaged by the hook 16 of the pulley 17, which latter may be raised by any suitable means as by the chain 18.

The operation of this improved lifting device is especially adapted for lifting the rear portions of Ford automobiles when the latter need repairs will be understood from the foregoing, but may be briefly summarized as follows:

When the machine is brought into the shop, and it is desired to lift the rear axle or the rear of the frame work and body portion high enough to enable a workman to conveniently get under the same, it is only necessary to place each of the rods 4 under the cross piece 1 near the sides of the machine and to hook the forward ends of said rods 4 over the longitudinal frame members 2.

That is to say, the vertical members 6 of the rods 4 will lie flatwise against the sides 11 of the frame members 2; the parts 7 of the rods 4 will lie flat on the top flanges 10 of the frame members 2; the parts 8 of the rods 4 will pass down over the edges of the flanges 10 of the frames 2, and the hook members 9 extending from the parts 8 will pass under said flanges 10, all as is clear from Figures 1 and 2.

It will thus be seen that after the rods 4 have been passed under the cross piece 1, their ends provided with the offset hook members will have to be pushed inward toward the center of the machine in order to engage their respective flanges 10. That is to say, the flanges 10 of the pair of longitudinally disposed frame members 2 extend in opposite directions, and therefore, the pair of members 7 and 9 on each rod 4 extend in opposite directions. In fact, unless each hook member 8 be provided with the auxiliary hook member 9, extending toward the body of its rod 4, the said rods 4 would not be held firmly in place during their lifting action when disposed as indicated in Figures 1 and 2. In other words, they are what may be called rights and lefts, as will be clear from Figure 1, showing the right hand flange 10 when looking toward the front of the machine and Figure 2, which shows the left hand flange 10 when looking toward the front of the machine.

The hook members 13 of the lifting member 14 having been passed through the eyes 5 of the rods 4, said member 14 together with the eyes 5 of the rods 4, may be now lifted by the pulley 17, whereupon the rods 4 taking under the cross member 1, as plainly illustrated in Figures 1 and 2, will lift the entire rear portion of the Ford machine, to any point desired. When it is desired to disengage the lifting member from the Ford machine, the pulley 17 is lowered, whereupon the parts are readily detached from the frame members 2 and may be readily detached from each other, and stored away.

It is obvious that those skilled in the art may vary the details of construction as well as the arrangement of parts without departing from the spirit of the invention, and therefore, I do not wish to be limited to the above disclosure except as may be required by the claims.

What is claimed is:

1. In a lifting device for automobiles having longitudinal frame members each provided with a flange, the combination of a lifting member provided with a pair of rod engaging means; and a pair of rods engaged by said means, each provided with four hook members successively disposed at an angle to each other, and the last pointing back toward its corresponding rod and adapted to take under one of said flanges, substantially as described.

2. In a lifting device for an automobile having a cross member and a pair of longitudinally disposed flanged frame members, the combination of a pair of rod members adapted to pass under said cross member and each having at one end four hook members disposed to one side of its body portion adapted to engage two sides of and beneath the flange of one of said frame members; and a lifting member adapted to engage the other end of said rod members, to lift said cross member and parts of the machine associated therewith, substantially as described.

3. In a lifting device for automobiles, the combination of a pair of rod members each provided at one end with four offset hook members, and at the other end with means for engaging a lifting member; and a lifting member provided with means for engaging said rod members, the hook members of each rod being so offset that they will oppose each other when in their lifting position and one of said hook members will point toward its corresponding rod member, substantially as described.

4. In a lifting device, for a Ford automobile, provided with longitudinally disposed frame members having flanges, the combination of a pair of rods adapted to lie parallel to each other when in their lifting positions, and having each at one end a set of four opposing offset hooks for engaging said flanges when in said lifting positions; and lifting means for engaging the other ends of said rods, substantially as described.

In testimony whereof I affix my signature.

HARRY P. STEADMAN.